(12) United States Patent
Huth et al.

(10) Patent No.: US 8,283,081 B2
(45) Date of Patent: Oct. 9, 2012

(54) MEMBRANE ELECTRODE ASSEMBLY WITH HYDROGENATABLE MATERIAL FOR A FUEL CELL

(75) Inventors: Andreas Huth, Braunschweig (DE); Christiane Jacksch, Laatzen (DE); Martin Thomas, Barsbuttel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 936 days.

(21) Appl. No.: 12/208,411

(22) Filed: Sep. 11, 2008

(65) Prior Publication Data

US 2009/0087698 A1    Apr. 2, 2009

(30) Foreign Application Priority Data

Sep. 11, 2007   (DE) .......................... 10 2007 044 246

(51) Int. Cl.
*H01M 8/02*  (2006.01)
*H01M 8/04*  (2006.01)
*H01M 8/10*  (2006.01)

(52) U.S. Cl. ......... 429/429; 429/480; 429/481; 429/483

(58) Field of Classification Search .................. 429/429, 429/480, 481, 483
See application file for complete search history.

(56) References Cited

U.S. PATENT DOCUMENTS

| | | | |
|---|---|---|---|
| 5,525,436 | A | 6/1996 | Savinell et al. |
| 5,599,639 | A | 2/1997 | Sansone et al. |
| 5,716,727 | A | 2/1998 | Savinell et al. |
| 6,080,501 | A | 6/2000 | Kelley et al. |
| 2007/0148531 | A1* | 6/2007 | Yoshizawa et al. ............. 429/44 |

FOREIGN PATENT DOCUMENTS

| | | | |
|---|---|---|---|
| JP | 59160969 A | * | 9/1984 |
| WO | 9814505 A1 | | 4/1998 |
| WO | 9852732 A1 | | 11/1998 |
| WO | 01/18894 A2 | | 3/2001 |
| WO | 99/04445 A1 | | 12/2008 |

OTHER PUBLICATIONS

English Language Abstract for DE 3114319, Dec. 1982.
English Language Abstract for DE 10065009, Jul. 2002.
English Language Abstract for DE 102004032999, May 2007.
English Language Abstract for DE 102004024845, Dec. 2005.
English Language Abstract for DE 102004024844, Dec. 2005.
English Language Abstract for DE 10317123, Nov. 2004.
English Language Abstract for DE 10246459, Apr. 2004.
English Language Abstract for DE 10052190, May 2002.
English Language Abstract for DE 3025208, Feb. 1982.
English Language Abstract for DE 2750463, May 1979.
English Language Abstract for EP 1351330, Oct. 2003.

* cited by examiner

*Primary Examiner* — Gregg Cantelmo
(74) *Attorney, Agent, or Firm* — Norris McLaughlin & Marcus PA

(57) ABSTRACT

The invention relates to a membrane-electrode assembly for a fuel cell with a proton-conducting membrane two catalyst layers adjoining both sides of the membrane, wherein the catalyst layers have an electrically conductive base material and at least one catalytic material deposited on the base material, and two gas diffusion layers adjoining the catalyst layers. The membrane and/or at least one of the catalyst layers and/or at least one of the gas diffusion layers includes at least one hydrogenatable material capable of binding hydrogen in a reversible exothermic hydrogenation operation by forming a hydride, depending on the temperature and/or pressure. The hydrogenatable material can be distributed in the gas diffusion layer and/or in the catalyst layer or can be present as a separate layer on at least one side of the gas diffusion electrode or the membrane.

13 Claims, 2 Drawing Sheets

MEMBRANE ELECTRODE ASSEMBLY WITH HYDROGENATABLE MATERIAL FOR A FUEL CELL

FIELD OF THE INVENTION

The invention relates to a membrane-electrode unit (MEA) for a fuel cell, a method for starting the MEA, and applications of the MEA.

BACKGROUND OF THE INVENTION

Fuel cells use the chemical reaction between hydrogen and oxygen to form water for producing electric energy. The core component of fuel cells is the so-called membrane-electrode assembly (MEA), which is a composite of a proton-conducting membrane and a corresponding gas diffusion electrode (anode or cathode) arranged on both sides of the membrane. The fuel cell is typically formed from a plurality of stacked MEAs, with their electric power being additive. During operation of the fuel cell, hydrogen $H_2$ or a hydrogen-containing gas mixture is supplied to the anode, where an electrochemical oxidation of $H_2$ to $H^+$ takes place by releasing electrons. The protons $H^+$ are transported (bound to water or in an anhydrous environment) from the anode space to the cathode space through the membrane, which separates the reaction spaces in a gas-tight manner and electrically isolates the reaction spaces from one another. The electrons provided at the anode are transported to the cathode via an electrical wire. In addition, oxygen or an oxygen-containing gas mixture is supplied to the cathode, thereby reducing $O_2$ to $O^{2-}$ through combination with the electrons. These oxygen anions react at the same time with the protons transported through the membrane by forming water. With the direct conversion of chemical energy into electrical energy, fuel cells attain a higher efficiency compared to thermal power generators, because they circumvent the Carnot factor.

Each of the electrodes has a catalyst layer facing the membrane. The catalyst layer is disposed on a gas-permeable substrate, the so-called gas diffusion layer (GDL), for homogeneous supply of the reaction gases. The catalyst layer contains reactive centers, typically containing platinum as an effective catalytic component, which is supported on an electrically conducting porous substrate material, for example carbon particles. The reaction centers must satisfy three conditions for efficiently converting the chemical energy of the reaction components. Firstly, the reaction centers of the electrodes must be electrically connected to an external electrical circuit. Secondly, the reaction centers must be connected with the membrane for ion-conduction, so that they can be supplied with protons or discharge protons at a high transport rate. Thirdly, the reaction centers must have ready access to the reaction gases. When all these three conditions are simultaneously satisfied, the so-called 3-phase boundary is formed (solid face=reaction centers of the electrodes//liquid phase=electrolyte//gaseous phase=reaction gases).

Today's most advanced fuel cell technology is based on polymer electrolyte membranes (PEM), wherein the membrane itself is made of an ion-conducting polymer. The most common PEM is based on a sulfonated polytetrafluoroethylene copolymer (trade name: Nafion; copolymer of tetrafluoroethylene and a sulfonyl acid fluoride derivate of perfluor (alkyl vinyl) ether) or of plastic materials analogous to Nafion. The electrolytic conduction takes place via hydrated protons, so that water in the liquid phase must be present for proton conduction. This causes a number of disadvantages. For example, the fuel gases must be humidified during operation of the PEM fuel cell, which increases system complexity. Failure of the humidifier may cause decreased efficiency and irreversible damage to the membrane-electrode assembly. The maximum operating temperature of these fuel cells is limited—also due to a lack of normal long-term stability of the membranes—to 100° C. at ambient pressure (this type of fuel cell is therefore primarily referred to as low temperature PEM fuel cell (LT-PEM fuel cell)). However, for several reasons, operating temperatures above 100° C. are desirable for both mobile and stationary applications. For example, heat transfer to the surroundings increases with increasing temperature difference, which facilitates cooling of the fuel cell stack. The catalytic activity of the electrodes and the tolerance for impurities in the fuel gases also increase with increasing temperature. At the same time, the viscosity of the electrolytic substances decreases with increasing temperature, which enhances material transport to the reactive centers of the electrodes. Finally, the produced product water is in gaseous form at temperatures above 100° C. and can be more readily removed from the reaction zone, so that gas transport paths (pores and meshes) in the gas diffusion layer remain unobstructed, and the electrolytes or electrolyte additives are not washed out.

High-temperature polymer electrolyte membrane fuel cells (HT-PEM- or HTM-fuel cells), which operate at temperatures of 120 to 180° C. and require only little humidification or no humidification at all, have been developed to take advantage of these advantageous properties. The electrolytic conductivity of the membranes used in these second-generation fuel cells is based on liquid electrolytes, in particular acids or bases, bound to the polymer skeleton by electrostatic complex formation which ensures proton conductivity above the boiling point of water even when the membrane is completely dry. For example, U.S. Pat. No. 5,525,436, U.S. Pat. No. 5,716,727, U.S. Pat. No. 5,599,639, WO 01/18894 A, WO 99/04445 A, EP 0 983 134 B, and EP 0 954 544 B describe high-temperature membranes made of polybenzimidazole (PBI) complexed with acids, for example phosphoric acid, sulfuric acid or other acids.

Although conventional HTM fuel cells advantageously have relatively high operating temperatures, they have a problem in that a decrease in the operating temperature below the boiling point of water, for example at the start of the fuel cell or when the system is shut off, can irreversibly damage the MEA, because the produced liquid product water washes out and carries away the electrolyte bound to the membrane, so that there are no longer enough charge carriers available for proton transport. The optimal operating temperature of modern HTM fuel cells is therefore around 160° C. and manufacturers recommend to always maintain the operating temperatures above 120° C., while maintaining the fuel cells at zero current at lower temperatures. However, especially for mobile applications in motor vehicles, a wide temperature window, starting at room temperature and below and reaching temperatures of well above 100° C., is desirable. DE 10 2004 024 844 A and DE 10 2004 024 845 A disclose gas diffusion electrodes for HTM fuel cells which overcome the problem associated with a lack of thermal cycling stability. The catalyst layers of the gas diffusion electrodes are here made of an electrode paste which includes a pore former and a polymer material, wherein the polymer material is preferably made of electrolyte-impregnated polyazoles. The fuel cells with these types of electrodes are significantly more stable against cycling compared to standard electrodes by preventing displacement and loss of the electrolyte. No decrease in the power was observed at a reference temperature of 160° C.

when the temperature was cycled between 40 and 160° C. in a two-hour rhythm for more than 800 hours.

In addition to power density and cycle stability, the HTM fuel cells must also satisfy another condition for application in vehicle propulsion, namely cold start ability at low temperatures, ideally at temperatures of about −40° C. Whereas Nafion-based fuel cells can achieve cold start at temperatures around −20° C. with a power density of about 0.05 W/cm$^2$, this has not yet been achieved with HTM fuel cells. In addition, it is desirable to quickly heat the fuel cell to the respective operating temperature, which lies significantly above room temperature for all types of fuel cells. For example, the necessary operating temperature of (Nafion-based) NT-PEM fuel cells is at about 80 to 90° C. and can reach 800 to 1000° C. for so-called solid oxide fuel cells (SOFC). Because the power density of the fuel cells is very low at low temperatures, self-heating due to exothermic fuel cell reactions is insignificant. Accordingly, additional energy must be supplied for heating.

EP 1 351 330 A2 discloses a fuel cell with bipolar plates, wherein particularly the flow channels for the process gases are made at least partially of a material or are coated with a material which forms a hydride in an exothermic hydrogenation reaction, with the generated heat heating the reaction gases and in turn raising the temperature of the MEA. In a preferred embodiment, this internal heating measure is combined with additional external or internal measures, such as electrical heating. However, coating of the bipolar plates with the corresponding material has proven to be complex due to manufacturing difficulties. Moreover, a certain time delay is also observed until the reaction gases cause sufficient heating of the MEA.

SUMMARY OF THE INVENTION

It is therefore an object of the invention to provide a membrane-electrode assembly for fuel cells which has an improved cold start ability and which heats up more quickly to the operating temperature compared to conventional systems.

DETAILED DESCRIPTION OF THE INVENTION

This object is attained by a membrane-electrode assembly (MEA) with the features of claim 1. The MEA includes (a) a proton-conductive membrane and (b) two porous catalyst layers adjoining both sides of the membrane, wherein the catalyst layers have an electrically conductive base material and at least one catalytic material deposited on the base material, as well as (c) two directly or indirectly adjoining (via interposed layer(s)) gas diffusion layers. The gas diffusion layers can form a composite with a catalyst layer, referred to as gas diffusion electrodes. It is also known to form the membrane as a composite with the catalyst layers as so-called CCM (catalyst-coated membrane). According to the invention, the membrane and/or at least one of the two catalyst layers and/or at least one of the two gas diffusion layers has at least one hydrogenatable material capable of binding hydrogen in a reversible exothermic hydrogenation operation by forming a hydride.

According to the invention, an additional heat source is hence introduced in the MEA by an additional exothermic chemical reaction, which does not correspond to the actual fuel cell reaction producing electricity, and which provides additional heating. It is of particular advantage that this heat source is located in direct proximity to the reaction centers of the fuel cell reaction, so that heat is generated exactly at the location where the fuel cell reaction is to be initiated. The fuel cell stack is heated directly in the reaction zone and not via an externally introduced heat flow. This eliminates the parasitic loss of thermal energy which would otherwise be needed for heating the lines, coolant, bipolar plates and other components of the fuel cell. In this way, the anode and/or cathode reaction of the fuel cell can be rapidly initiated at least locally, thereby again releasing heat and causing additional heating of the entire fuel cell to its operating temperature. As a result, the MEA of the invention or a fuel cell contained can be started quickly already at low temperatures, with the lowest attainable startup temperature depending on the hydrogen absorption range of the employed hydrogenatable material or the combination of several hydrogenatable materials. Advantageously, heat-up occurs "fuel-neutral", because the absorbed hydrogen is released again after reaching a material-specific desorption temperature and is then used as fuel gas for the fuel cell.

Hydride formation—at a specified pressure and temperature—is a spontaneous exothermic process. Hydride formation is temperature dependent, with the reaction speed increasing with increasing temperature. Once the reaction has started, it is accelerated auto-catalytically by the released energy until the reversal temperature is reached. The material-specific reversal temperature is the temperature where hydride formation ceases and the (endothermic) desorption of hydrogen starts. Hydrogen released in this manner is therefore available either for energy generation by the fuel cell reaction or for renewed absorption by another hydrogenatable material. In the overall balance, the cold start is fuel-neutral over the operating time. Although the endothermic desorption of the employed materials causes some cooling, this is compensated by the onset of the fuel cell reaction which causes the system to heat up.

Advantageously, the MEA of the invention is of the aforedescribed HT-PEM type, which is based on a membrane consisting of an electrolyte-impregnated polymer material. However, a LT-PEM-MEA with a membrane based on an ion-conducting (Nafion or Nafion-like) polymer material can also be employed, or a MEA for solid oxide fuel cells (SOFC) or other types of fuel cells. In any event, the advantageous capability of the MEA according to the invention is used to start the fuel cell and/or heat the fuel cell to its operating temperature, which is also significantly above room temperature (80-90° C. for LT-PEM fuel cells and 800-100° C. for SOFC).

The at least one hydrogenatable material can exist in the various components of the MEA in different forms, which can advantageously also be combined with one another. According to a preferred embodiment of the invention, the hydrogenatable material is distributed within the catalyst layer and/or within the gas diffusion layer, i.e., in a more or less homogeneous mixture with the other components of the catalyst layer (in particular with the catalytic material whose support material and optionally a polymer binder) or of the gas diffusion layer. The at least one hydrogenatable material can have a stepped or gradual concentration gradient in the catalyst or gas diffusion layer. For example, the material in the gas diffusion layer can have a concentration that increases towards the catalyst layer, which produces increasing heating in direction of the catalyst layer. For example, the hydrogenatable material can be provided in the corresponding layer in form of homogeneously distributed micro- or nano-particles.

A catalyst layer in which the hydrogenatable material is dispersed can be readily produced from an electrode paste, as described in DE 10 2004 024 844 A1 and DE 10 2004 024 845 A1. An electrode paste is made from a catalytic material that is immobilized on a carrier and contains at least one hydrogenatable material, a pore former and optionally a polymer binder in a suitable solvent. The electrode paste is applied on a GDL and cured at elevated temperature by producing a solid porous catalyst layer. Optionally, the aforedescribed concentration profile of the hydrogenatable material can be adjusted. Alternatively, the membrane can be coated with the electrode paste in a similar manner for producing a catalyst layout on the membrane side. However, if the hydrogenatable material is to be introduced in the gas diffusion layer of the electrode, then the finished gas diffusion layer is preferably applied first, while the interstitial fiber spaces are subsequently enriched with the hydrogenatable material, for example by placing or immersing the GDL in a suspension of the material in a suitable solvent, coated with the suspension or suctioned and/or pressed into the GDL by vacuum or overpressure. The suspension can also be applied by a spray process. Alternatively, the powdered hydrogenatable material can be blown into the interstitial spaces of the GDL by a kind of sandblasting process. If desired, a concentration gradient of the hydrogenatable material can be produced by using any one of those methods.

Alternatively, the at least one hydrogenatable material may be provided as one or more porous layers, for example, as a layer disposed between the catalyst layer and the gas diffusion layer or in form of a layer disposed on the side of the gas diffusion layer facing away from the catalyst layer, or in form of layers arranged on one side or on both sides of the membrane. Such layer structures can be produced, for example, from a suspension of the material by a screen-coat process, a spray-coat process or a rolling process, or a combination thereof. The material can advantageously be introduced into an electrode paste (with or without a catalytic material), like in the process described above with reference to DE 10 2004 024 844 A1 and DE 10 2004 024 845 A1. The GDL and/or the membrane can be coated on one side or on both sides with this paste using one of the aforedescribed processes.

Preferably, the membrane-electrode assembly also has a controllable adjustable gas supply such that the at least one hydrogenatable material can be brought in contact with supplied hydrogen gas. Because the gas diffusion electrode connected as anode already has a hydrogen supply, at least the gas diffusion electrode connected as anode should be constructed according to the invention, i.e., containing at least one hydrogenatable material.

Reversibility of the hydrogenation of the material is an important prerequisite, because repeated use of the material for cold starting the fuel cell is possible only through repeated hydrogenation (charging) and dehydrogenation (discharging). To have a sufficient quantity of hydrogenatable material available for the next cold start, the material must, if possible, be completely dehydrogenated before the system is shut down. Absorption and desorption does not take place without hysteresis, i.e., the absorption pressure is typically higher than the desorption pressure for the same temperature. Accordingly, desorption is preferably carried out at a lower pressure than absorption. A higher temperature due to the increased operating temperature of the MEA is another parameter which shifts the equilibrium in favor of the desorption reaction when the system is shut down.

According to an advantageous embodiment of the invention, the at least one hydrogenatable material is a metal or a metal alloy capable of forming hydrides at low temperatures. Suitable metals belong to the group Ti, Fe, Cr and Zr, which can optionally contain as other constituents Ca, Mg, Cu, Ni and/or Mn. Concrete examples are described in the exemplary embodiments.

Most materials do not have an absorption temperature range that extends from very low temperatures to the operating temperature of the fuel cell. According to another advantageous embodiment of the invention, the hydrogenatable material includes two or more hydrogenatable materials with cascading, overlapping absorption temperature ranges, thereby forming in combination a total absorption temperature range. In this way, the fuel cell can perform a cold start from almost any temperature. At the same time, the system can be heated to a certain minimum operating temperature by suitable selection and combination of the materials based on their continuous hydrogenatability over the entire temperature range. Therefore, there is no longer a need for a combination with additional heating methods, for example electric heating, although these combinations are not excluded in the context of the invention.

Advantageously, the at least one hydrogenatable material, or in the case of two or more hydrogenatable materials at least one of the materials, is selected so that its absorption temperature range begins at most $-10°$ C., in particular at most $-20°$ C., preferably at most $-30°$ C. In particular for applications in motor vehicles, a material can be used that absorbs hydrogen and supplies heat already at temperatures of $-40°$ C. and below, thus enabling cold start already from this temperature on up.

To continuously heating the MEA from the initial temperature to the startup of the MEA, the hydrogenatable materials are preferably selected so that their combined absorption temperature ranges cover a total absorption temperature range, which at least approximately extends to a lowest operating temperature of the MEA. In a particularly preferred embodiment, the upper limit temperature of the total absorption temperature range extends to 10K below the lowest operating temperature, preferably to 5K below the lowest operating temperature. The lowest operating temperature is hereby defined at the temperature of the MEA where at least 50% of its maximum electrical power is attained. In this way, the MEA already produces a certain power when reaching the upper limit temperature of the overall absorption temperature range, which in turn results in further heating. In particular, the materials are selected so that the overall absorption temperature range extends from $-40$ to $180°$ C. for a HT-PEM fuel cell, from $-40$ to $90°$ C. for a LT-PEM fuel cell, and from $-40$ to $1000°$ C. for a SOPC fuel cell.

A further aspect of the present invention relates to a method for starting the membrane-electrode assembly according to the invention at a temperature below the operating temperature of the membrane-electrode assembly, in particular below $0°$ C., with the steps:

supplying a hydrogen-containing gas to the gas diffusion electrode(s) containing the at least one hydrogenatable material, increasing the pressure of the reaction space(s) supplied with hydrogen, so that hydrogen is absorbed by the at least one hydrogenatable material, when reaching a temperature that at least approximately corresponds to the lowest operating temperature of the MEA, switching the gas supply over to the fuel gases of the membrane-electrode assembly, and switching on an electric load.

By enabling startup of the MEA at very low temperatures, i.e., at temperatures encountered in motor vehicles, the MEA of the invention or a fuel cell contained therein can particularly advantageously be employed in mobile applications, such as traction systems of motor vehicles or for supplying additional energy as a so-called APU (auxiliary power unit) in motor vehicles. It will be understood that the MEA of the invention can also be employed in stationary applications, in particular in small power plants or residential power supply units.

Other advantageous embodiments of the invention are recited as additional features in the dependent claims.

BRIEF DESCRIPTION OF THE DRAWINGS

Exemplary embodiments of the invention will now be described with reference to the appended drawings.

FIG. 1A is a simplified schematic diagram of a HT-PEM fuel cell 10 with a fuel cell stack 12 having a plurality of serially connected membrane-electrode assemblies 14 (MEAs), with one of the assemblies 14 shown in FIG. 1A in an enlarged cross-sectional view. A diagram of a detail of the membrane-electrode unit 14 is shown in FIG. 1C, also in cross-section. A coolant is supplied to each MEA 14 of the fuel cell stack 12 via a central channel. The coolant is transported by a pump and flows through a heat exchanger (the cooling system is not illustrated). The cooling loop includes a bypass line, so that the coolant can be circulated through the stack 12 in a closed loop by bypassing the heat exchanger.

As illustrated in FIGS. 1B and 1C, the MEA 14 includes a proton-conducting (essentially anhydrous) polymer electrolyte membrane 16 which is formed of a suitable polymer material 24 and impregnated with at least one electrolyte 26. For example, the polymer material can be a polymer from the group of polyazole and polyphosphazene. In particular, the polymers polybenzimidazole, polyimidazole, polypyridine, polypyrimidine, polyimidazole, polybenzthiazole, polybenzoxazole, polyoxadiazole, polychinoxaline, polythiadiazole, poly(tetrazapyrene), polyvinylpyridine, polyvinyl imidazolate should be mentioned.

Figures 1A, 1B, 1C:
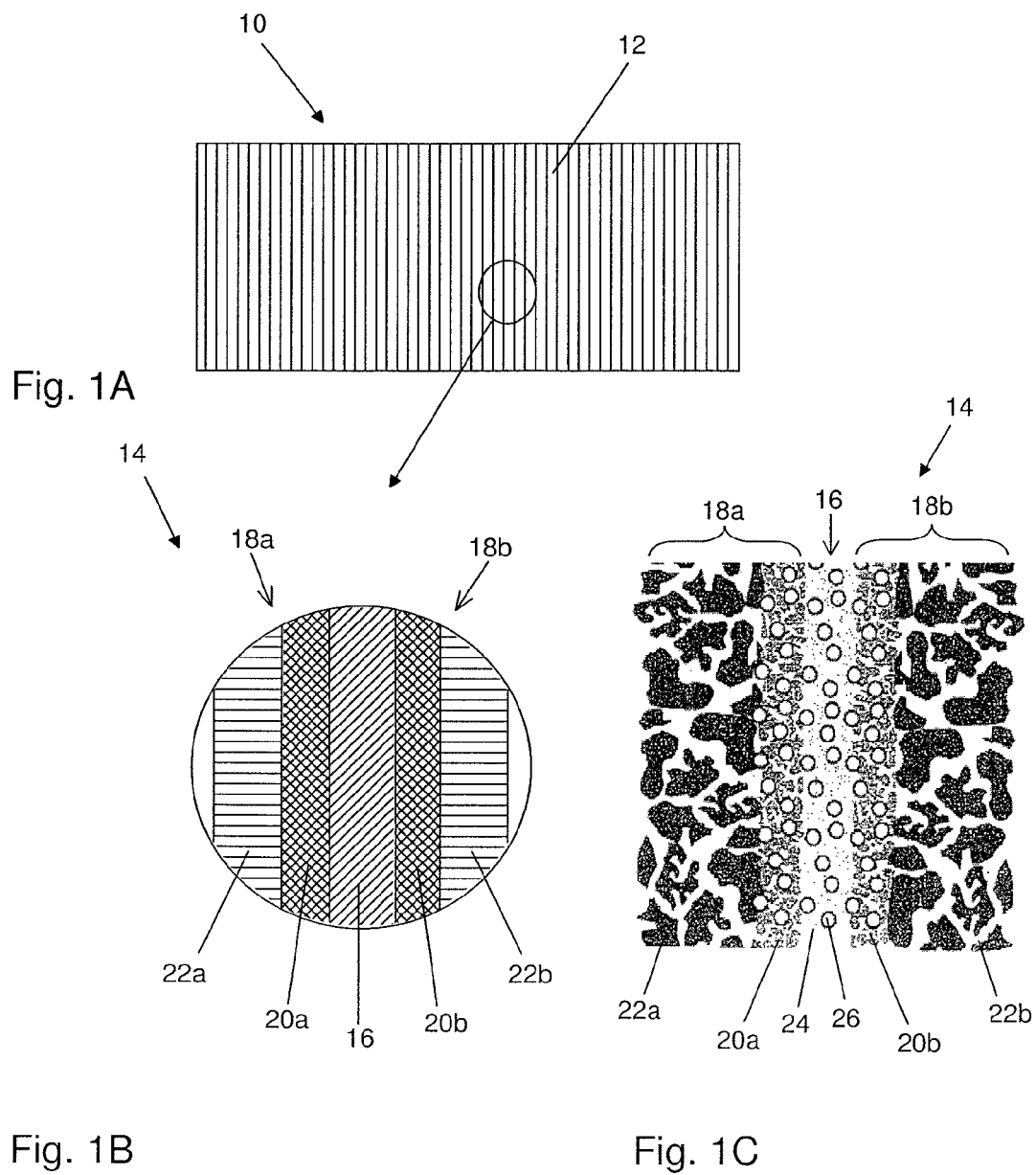
FIG. 1A shows a simplified schematic diagram of a fuel cell.
FIG. 1B shows a detail of FIG. 1A with a membrane-electrode assembly.
FIG. 1C shows a detailed diagram of a membrane-electrode assembly according to the present invention.

The anhydrous proton conduction of the polymer membrane 16 and/or the polymer material 24 is based on the electrolyte 26 which, in particular, is a solution of a temperature-resistant electrolyte with a high boiling point. This is preferably an acid such as phosphoric acid, phosphinic acid, phosphonic acid, nitric acid, hydrochloric acid, formic acid, acetic acid, trifluoro-acetic acid, sulfuric acid, sulfonic acid, in particular a (per)halogenated alkyl-oder arylsulfonic acid, or (per)halogenated alkyl- or arylphosphonic acid, in particular methansulfonic acid or phenylsulfonic acid. Phosphoric acid alkyl- or phosphoric acid arylester (unhalogenated, partially halogenated or completely halogenated, in particular fluorinated alkyl- or aryl residuals), hetero-polyacids, such as hexafluoroglutaric acid (HFGA) or squaric acid (SA) can also be used. Alternatively, the electrolyte 26 can be a base, in particular an alkali or alkaline earth hydroxide, such as potassium hydroxide, sodium hydroxide or lithium hydroxide. Polysiloxanes or nitrogen-containing heterocyclic compounds can be used as electrolyte 26 or electrolyte additive, for example imides, imidazoles, triazoles and derivatives thereof, in particular perfluoro-sulfonimide. Ionic liquids, such as 1-Butyl-3-methyl-imidazolium trifluoromethane sulfonated, can also be used as electrolytes. All the aforementioned electrolytes can also be used as derivatives or salts (DE 102 46 459 A1). It is also feasible to use a mixture of different ones of the aforementioned electrolytes for impregnating the polymer material 24.

Preferably, proton exchanger membranes are employed which are formed by impregnating a temperature-stable basic polymer with an acid, wherein the concentration of the electrolyte solution is between 60 to maximal 99 wt.-% relative to the polymer material. In the present example, a membrane of polybenzimidazole (PBI) is used as anhydrous polymer material 24, to which phosphoric acid is bound as the electrolyte 26.

A corresponding gas diffusion electrode 18a and 18b adjoins each of the two outer membrane surfaces, wherein the electrode 18a is connected as cathode on the cathode side of the membrane 16 and the electrode 18b is connected as anode on the anode side. Each of the gas diffusion electrodes 18a and 18b includes a micro-porous catalyst layer 20a and 20b, making contact with both sides of the polymer electrolyte membrane. The catalyst layers 20a, 20b include as the actual reactive centers of the electrodes a catalytic material, typically a noble metal as an active catalytic material, such as platinum, iridium or ruthenium, or transition metals such as chromium, cobalt, nickel, iron, vanadium or tin or mixtures or alloys thereof. The catalytic material is preferably affixed to a porous, electrically conductive carrier material. The carrier material can be gas-permeable, electrically conductive carbon materials, such as gas-permeable carbon-based particles, woven fabrics or felts. The reactive centers of the electrodes are electrically connected to an external electrical circuit (not illustrated) by way of the support material of the catalyst layers 20a and 20b. In the present example, the reactive centers of the catalyst layers 20a, 20b are made of platinum supported on carbon particles, wherein the particles are combined to a porous and hence gas-permeable composite.

Figure 3:
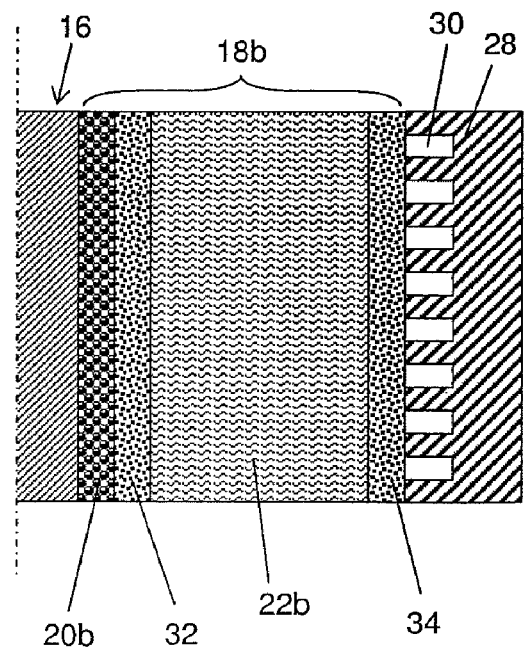
FIG. 3 shows the structure of a gas diffusion electrode according to the invention.

Each of the gas diffusion electrodes 18a and 18b also includes a gas diffusion layer (GDL) 22a and 22b, which adjoin the respective outer surfaces of the catalyst layer 20a and 20b, respectively, that face away from the polymer membrane 16. It is a function of the GDL 22a, 22b to ensure that the reaction gas oxygen or air flows uniformly against the corresponding catalyst layer 20a, 20b on the cathode side, and that the reaction gas hydrogen flows uniformly against the corresponding catalyst layer 20b, 20a on the anode side. The GDL 18a, 18b adjacent to the catalyst layer 20a, 20b can also have a thin, for example carbon-based, micro-porous layer (not illustrated). Also not illustrated in FIGS. 1B and 1C are so-called bipolar plates (BP) which make electrical contact to both sides of the MEA assembly and supply the process gases and discharge the product water and also separate the individual MEAs 14 in the fuel cell stack 12 in a gas-tight manner (FIG. 3). Also not illustrated are materials for sealing and stabilizing the MEA 14.

Figure 2:
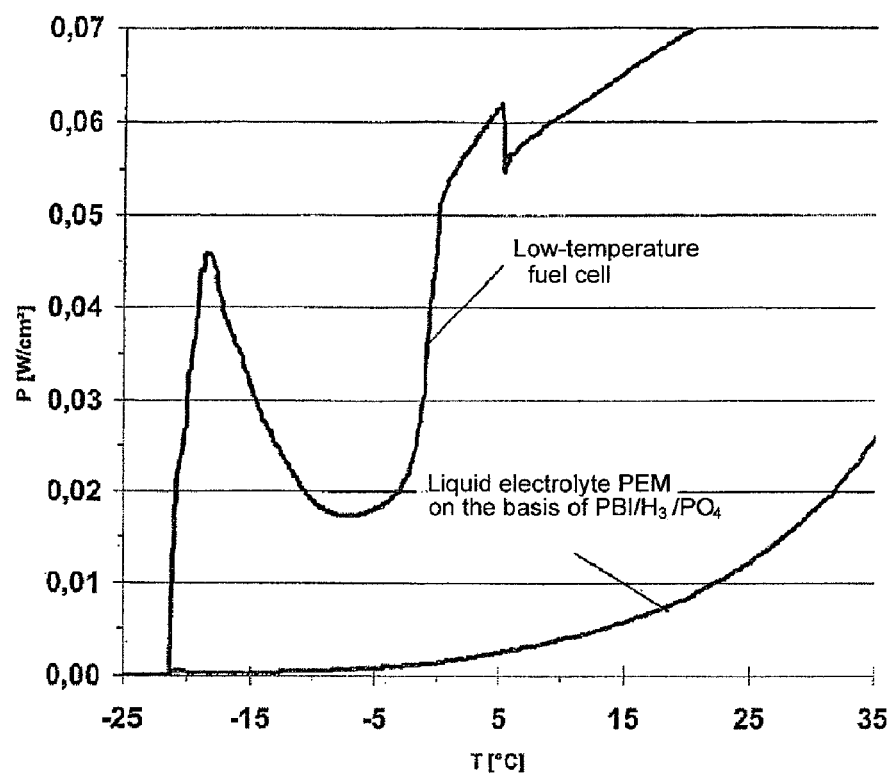
FIG. 2 shows the temperature dependence of the electric power of a LT-PEM and a HT-PEM fuel cell.

FIG. 2 shows a comparison of the functional dependence of the electrical power of a HT-PEM fuel cell according to the preceding discussion and a LT-PEM fuel cell based on a conventional Nafion membrane. It can be clearly seen, the power in the HT-PEM fuel cell sets in at significantly higher temperature than in the LT-PEM fuel cell, because the resistance against mass transport increases more strongly with decreasing temperature. However, even the LT-PEM fuel cell (as well as the unillustrated SOFC) exhibits a noticeable decrease in power below its optimal operating temperature range, because the resistances increase even more drastically below the freezing point of water, as is evident from the steep falloff of the power below 0° C. The efficiency of the reactive centers of the electrodes is at these temperatures significantly diminished by the electrolyte, frozen water or by obstacles to ion transport. The reaction heat from the fuel cell reaction alone can therefore not raise the temperature of the fuel cell at temperatures well below its optimum operating temperature, and additional heating is therefore required.

According to the invention, at least one of the gas diffusion electrodes 18a, 18b, in particular their catalyst layers 20a, 20b and/or gas diffusion layers 22a, 22b, have at least one reversibly and exothermally hydrogenatable material whose hydrogen absorption is used for heating the MEA 14 and the fuel cell 10, respectively. The structure of such gas diffusion electrode according to the invention is schematically illustrated in FIG. 3 for an exemplary anode 18b, wherein the same reference symbols to those of FIG. 1 are use to indicate identical elements.

According to FIG. 3, the membrane 16 is contacted by the anodic gas diffusion electrode 18b, in particular by its catalyst layer 20b. Also shown is a bipolar plate 28 made of a suitable material and arranged on the side of the gas diffusion electrode 18b facing away from the membrane. The bipolar plate 28 has a plurality of transport channels 30 for supplying the reaction gases (hydrogen to the anode and oxygen to the cathode) as well as removing the product water on the cathode side.

According to the illustrated example, a layer 32, 34 of the hydrogenatable material is disposed on both sides of the gas diffusion layer 22b, namely a layer 32 disposed between the GDL 22b and the catalyst layer 20b, and a layer 34 disposed between the GDL 22b and the bipolar plate 28. In a modification of the illustrated example, only one of the two functional layers 32, 34 may be provided, or a modified catalyst layer 20b containing the hydrogenatable material may be provided instead of the layer 32. Alternatively or in addition, a hydrogenatable material may also be present inside the catalyst layer 20b and/or of the GDL 22b, for example in form of particles or fibers which are intermixed with the other components of these parts. The present invention also includes embodiments, wherein both, or only one of the, gas diffusion electrodes 18a, 18b include a hydrogenatable material. In the latter case, the anode 18b has the features of the invention, because hydrogen is always supplied on the anode side. Hydrogen for heating the material is thereby applied to the hydrogenatable material through the transport channels 30 of the bipolar plate(s) 28, i.e., from right to left in FIG. 3.

The employed hydrogenatable materials are preferably metals or metal alloys which at temperatures below freezing form low-temperature hydrides in an exothermic reaction upon contact with hydrogen. In most cases, materials are used which contain as primary alloy components titanium (Ti), iron (Fe), zirconium (Zr), chromium (Cr) or a mixture thereof. Suitable materials and several of their physical parameters are listed in Table 1.

The quantity of the hydrogenatable material—or its total quantity if several hydrogenatable materials are used—is determined based on the amount of heat required for a heating the MEA 14 to or several degrees Kelvin below its minimum operating temperature, wherein preferably a lowest possible start temperature of −40° C. is assumed. The amount of a heat generated by the hydrogenation must be adequate, in particular, to heat the frozen water/electrolyte phase and the surrounding layers to the target temperature. The amount of heat usable for this purpose can be determined from the material-specific reaction enthalpy of the hydrogenation reaction and the absorbed quantity of hydrogen. Examples for suitable hydrides and their reaction enthalpies are listed in Table 1 and are typically in a range from 15 to 75 kJ/mole$_{H2}$ (per absorbed mole of H$_2$). The required mass of the hydrogenatable material(s) can be determined from the mass absorption of hydrogen, which is between 2 and 5% (Table 1, absorption capacity).

In a preferred embodiment, a mixture of several hydrogenatable materials is used, so that the entire temperature range, starting at the lowest possible start temperature up to a target temperature located at or slightly below the minimum operating temperature of the MEA, is covered by the absorption ranges of the materials. A cold start can then occur from different start temperatures, and the system can be heated to the target temperature without the need for a combination with other heating methods. The materials are selected by taking into consideration a graduated, cascaded temperature behavior in the absorption and desorption characteristics, wherein the absorption temperature ranges should overlap by at least 10K (Table 1). For example, a mixture of Ti—Zr—Cr—Fe (absorption range 60 . . . 20° C.), Mn—Ca—Ni—Al (−40 . . . +40° C.), Ti—Cr—V—Fe (−10 . . . +80° C.) and Ti—Zr—Mn—V—Fe (+40 . . . +160° C.) can be used. At a starting point of −40° C., a first hydrogenation of Ti—Zr—Cr—Fe takes place which stops upon reaching a temperature of −20° C. Hydrogen is then desorbed from Ti—Zr—Cr—Fe and again resorbed by Mn—Ca—Ni—Al. This cascade continues until ΔT reaches a value of preferably ≧5K below the minimal operating temperature in the reaction zone. At the end of the temperature cascade, the supply of the fuel cell 10 is switched to the operating condition, i.e., the anode 18b continues to be supplied with hydrogen, whereas the cathode 18a—as long as it is provided according to the invention with the hydrogenatable material—is switched over from hydrogen to a oxygen-containing gas (air). At the same time, the electric load is switched on. Because the operation of the fuel cell 10, which now operates at, for example, only 80% of its maximal capacity, also causes a rise in the temperature due to internal losses. In this way, a continuous temperature increase can be achieved, starting from −40° C. or below up to the operating temperature of 160° C. or even 180° C.

I. Diagram of a GDL Containing at Least One Hydrogenatable Material in Distributed Form The object of the following process variants is to enrich the fiber interstitial spaces of a GDL 22 with the at least one hydrogenatable material, so that the GDL 22 thereafter contains the material in distributed form. Optionally, a concentration profile can be produced in the GDL 22, wherein the concentration increases in the direction towards the membrane side of the GDL 22, or in the direction of the bipolar plate 28. Any commercially available GDL can be employed for LT- and HT-PEM fuel cells, for SOFCs, or others.

(a) Fabrication by flooding. A suspension of the at least one hydrogenatable material is produced in a suitable solvent with a mass fraction of 0.01 to 99%, in particular 5 to 60%. A GDL is immersed in the suspension. Introduction of the materials in the pores of the GDL can be accelerated by applying a reduced pressure of up to 5 mbar to the GDL in a desiccator at room temperature. This process can be repeated several times in order to completely fill the porous and increase loading of the GDL with the material.

(b) Fabrication by immersion. A GSL is immersed once or several times in a suspension as in a) and removed again.

(c) Fabrication by suctioning. A GSL is placed on a Buchner funnel and moistened on one side with a suspension as in a). A reduced pressure applied from below suctions the suspension with the hydrogenatable material into the pores of the GDL. This process can be repeated several times to completely fill the pores and increase loading of the GDL with the material.

(d) Fabrication by spray coating or brushing. Alternatively, a GSL can be coated with a suspension as in a) on one side or both sides using an airbrush method, a brush or an inkjet process, wherein the suspension enters the pores of the GDL. This process can be repeated several times. The GDL treated by a process according to a) to d) is dried in a desiccator at room temperature or at an elevated temperature in a vacuum of up to 1 mbar for at least 5 minutes, thereby removing the solvent. A porous mass of the hydrogenatable material is left behind in the interstitial fiber spaces of the GDL.

(e) Fabrication by blowing. The hydrogenatable material is blown into one side or both sides of the GDL with an inert carrier gas as a powder, similar to a sandblasting process.

II. Diagram of a GDL 22 Provided with a Functional Layer 32, 34

The object of the following process variants is application of functional layers 32, 34 on one side or both sides of a GDL 22, which can be treated according to the preceding discussion under I) or can be untreated. The layers can consist entirely of the at least one hydrogenatable material or can contain this material in addition to other components. Basically, several such layers containing different quantities of the hydrogenatable material and/or different hydrogenatable materials can be stacked on top of one another, resulting in a stepped concentration curve. The layers can be applied with or without an ambient inert gas atmosphere.

(a) Application from a paste by a screen printing method. In analogy to DE 102004024844 A1, a paste is produced, except for the fact that this paste does not include a catalytic material. In this process, a solvent, for example N,N-dimethylformamide or N,N-dimethylacetamide, is mixed with at least one hydrogenatable material, a carbon material having, for example, an active surface of 150 to 2000 $m^2/g_{carbon}$, and optionally with a polymer binder, which is preferably based on the same polymer as the employed membrane. The polymer binder is used to bind the electrolyte in the MEA and to prevent it from being washed out. The paste can have a mass fraction of the hydrogenatable material of 0.01 to 99%, in particular 5 to 60%. The electrode paste is homogenized in an ultrasound bath, a ball mill, with a magnetic stirrer or the like. The paste also includes a pore former, which is worked into the paste when the components are mixed or immediately before the paste is applied on the GDL, or is dispersed onto the paste after application, or is dispersed before application onto the surface of the GDL to be coated. The pore former is preferably a material that can be completely or partially transformed thermally into the gaseous state and hence generates during heating a pore structure or gas channels within the layer 32, 34. For example, the pore former can be an inorganic carbonate, such as ammonium carbonate and/or an azide, for example sodium or calcium azide. A single layer or multiple layers are printed with the produced paste on one side or on both sides on the GDL 22 using a screen printing method. Alternatively, the paste can be pressed or rolled onto one side or both sides of the GDL. The coated GDL is dried in a desiccator at room temperature or at elevated temperatures at a vacuum of up to 1 mbar for at least 5 minutes, thereby removing the solvent. The pore former is decomposed and volatile components thereof evaporate. A layered porous carbon-supported mass of the hydrogenated material remains on the interstitial fiber spaces of the GDL.

(b) The process is identical to a), with the electrode paste containing in addition a catalytic material. More particularly, instead of the carbon material, a catalytic powder is added which contains a catalytic material, for example Pt, supported on a carrier material, for example carbon particles. For example, a catalyst powder Pt/C with a platinum loading of 10-70 wt.-% is used (e.g., E-TEK HP-II). A catalyst layer is thereby produced within which the at least one hydrogenatable material is dispersed.

(c) As an alternative to a) or b), a functional layer 32, 34 is applied on a GDL 22 by pressing or rolling a powder layer of the hydrogenatable material with a suitable binder with or without solvent. For ceramic SOFC electrodes, the layer 32, 34 is sintered after application. Alternatively or in addition, the SOFC electrode can be introduced and sintered in the GDL.

To obtain a fully operational gas diffusion electrode 18, the GDLs produced according to I.) or according to II.a) or c) are subsequently provided with a catalyst layer 20, using again the process described in DE 102004024844 A1. Optionally, an additional hydrophobic barrier layer, which functions as oxidation protection for the hydrogenatable material of the functionally layer 32, can be applied on the functional layer 32 before the catalyst layer 20 is applied, for example by depositing hydrophobic particles (e.g., made of PTFE) as a solid material or in solution by a screen printing method. The optional barrier layer disposed between the catalyst layer 20 and the functionally layer 32 operates as a liquid barrier and hence protects the hydrogenatable material against oxidation.

III. Fabricating a Membrane Provided with a Functional Layer

The object of the following process variants is application of functional layers on one side or both sides of a dry membrane or of a membrane doped with an electrolyte. A doped membrane should have an electrolyte fraction between 30 and 99% relative to the total mass of membrane and electrolyte. The functional layer may contain only hydrogenatable material or also additional components. Basically, several such layers may be applied sequentially, which may contain different concentrations of the hydrogenatable material and/or different hydrogenatable materials, resulting in a stepped concentration profile. The layers can be applied under or without an inert gas atmosphere.

(a) Application onto the membrane from a paste by a screen printing method. This process is essentially identical to the process described under II.a), with the difference that instead of the GDL, on one side or on both sides of a membrane is/are coated with the paste.

(b) The process is essentially identical to the process described under II.a), with the difference that the paste containing a catalytic material is used to coat instead of the GDL one side or on both sides of a membrane.

(c) As alternatives to a) or b), a functional layer is applied on one side or on both sides of the membrane by a spray-coat process, similar to the airbrush process. After spray coating, the membrane is dried as described under II.a).

The produced membranes (CCM for catalyst coated membrane) are combined with two untreated GDL or with a GDL treated according to I.a) to e) to obtain a MEA according to the invention. For producing a MEA, the coated membrane can also be combined with a gas diffusion electrode produced according to II.a) to c).

Process for Starting a Fuel Cell (Cold Start Process)

To start a fuel cell 10 of the invention, which according to the invention has an electrode made of at least one hydrogenatable material as anode 18a and/or as cathode 18b, multiple times, a suitable operating strategy must be developed. Such a strategy is described in detail below.

A cold start requires that at least for the most part, preferably almost always, the hydrogenatable material is present in its dehydrogenated state. This is ensured by a purging the fuel cell 10 at its operating temperature with a hydrogen-free gas before the system is shut down.

For a cold start below freezing and at a system pressure $p_{tot}$ of the fuel cell stack 10 of 1 mbar, dry hydrogen is flowed over the at least one electrode 18a and/or 18b, and the operating pressure of the media is increased to $P_{tot} > 1$ bar. Hydrogen flows through the flow passages of the bipolar plate 28 and flows over the transport channels 28 in the electrodes 18a, 18b according to the invention, in particular through the GDL 22a, 22b loaded with the hydrogenatable material, the functional layers 34, 32 and the catalyst layer 20a, 20b. Exothermic hydride formation of the hydrogenatable material begins spontaneously upon contact with hydrogen. The temperature in the reaction zone increases due to the heat transported from the exothermic absorption reaction to the surroundings of the hydrogenatable material. Because the equilibrium temperature is pressure-dependent, it is adjusted by controlling the total pressure $p_{tot}$ of the system. In addition, the cell temperature is controlled by the coolant mass flow, which supplies all MEAs 14 via a common channel. An integrated bypass of the cooling loop enables partial or complete circulation of a coolant through the cooling channels of the individual cells during cold start.

When the temperature difference is $\geq 5K$ below the minimum operating temperature of the fuel cell 10, gas supply to the electrodes 18a, 18b is switched over to the respective fuel gases. For example, if the cathode 18a was supplied with $H_2$ during startup, it is switched over to an oxygen-containing fuel gas. Conversely, the anode 18b can continue to be supplied with $H_2$. At the same time, the electric load is switched in, thereby starting the fuel cell reaction. The released dissipated heat causes additional heating of the fuel cell to its operating temperature. The coolant flow is switched over to a heat exchanger and the temperature is regulated to a desired value only after reaching the operating temperature.

Process for Switching Off the Fuel Cell

The operating temperature of the fuel cell 10 during operation causes hydrogen to be desorbed to the most part, but not completely, by the hydrogenatable material, because $H_2$ continuously purges the gas diffusion layer of the anode 18b. The remaining, not yet completely absorbed hydrogen must be completely desorbed before another cold start. Conditions for switching off the fuel cell stack 12 must therefore be established which promote desorption of hydrogen. In particular, the pressure during ramp-down is lowered to the ambient level and the circulation of the coolant is switched off. In addition, the supply of hydrogen is turned off and exchanged for a hydrogen-free gas, for example argon, air, nitrogen or the like. Instead being purged with the hydrogen-free gas, the stack 12 can also be evacuated by, for example, connecting the anode- and/or cathode-space with the suction side of a compressor. The higher temperature following disconnection of the cooling, the reduced pressure and the purge with the hydrogen-free gas enable a complete desorption of the material. After a purge time of at least 5 minutes, the fuel cell system is turned off and the cell temperature decreases again to the cold start level.

| The coolant flow is omitted when using a SOFC system. | | | | | |
|---|---|---|---|---|---|
| Alloy | Typical Composition | Absorption capacity [wt.-%] | Equilibrium Pressure [MPa] | Reaction Heat [kcal/mol$_{H2}$] | Temperature Range [° C.] |
| Ti—Fe—C | TiFe$_{0.8}$C$_{0.1}$ | 1.9 | 0.15 (20° C.) | −6.1 | 10 ... 50 |
| Ti—Fe—Ta | TiFe$_{0.96}$Ta$_{0.01}$ | 1.7 | 0.20 (25° C.) | −6.2 | 10 ... 50 |
| Ti—Fe—Ca | TiFe$_{0.93}$Ca$_{0.03}$ | 1.7 | 0.15 (50° C.) | −6.7 | 20 ... 60 |
| Ti—Fe—Ca—Mn | TiFe$_{0.8}$Mn$_{0.15}$Ca$_{0.01}$ | 1.7 | 0.50 (60° C.) | −6.8 | 20 ... 60 |
| Ti—Cr—Fe | TiCr$_{1.3}$Fe$_{0.5}$ | 1.8 | 0.50 (−60° C.) | −5.1 | <−40 |
| Ti—Zr—Cr—Fe | Ti$_{0.7}$Zr$_{0.3}$Cr$_{1.3}$Fe$_{0.5}$ | 1.9 | 0.15 (−60° C.) | −5.9 | −60 ... −20 |
| Ti—Zr—Cr—Fe—Mn—Cu | Ti$_{0.6}$Zr$_{0.4}$Cr$_{1.0}$Fe$_{0.6}$Mn$_{0.4}$Cu$_{0.03}$ | 1.7 | 0.40 (20° C.) | −6.9 | −20 ... 60 |
| Zr—Ti—Cr—Fe—Mn—Cu | Zr$_{0.7}$Ti$_{0.3}$Cr$_{1.0}$Fe$_{0.6}$Mn$_{0.4}$Cu$_{0.03}$ | 1.6 | 0.35 (110° C.) | −8.6 | 50 ... 150 |
| Ti—Mn—V | TiMn$_{1.43}$V$_{0.43}$ | 2.0 | 0.61 (40° C.) | −6.9 | −20 ... 60 |
| Ti—Zr—Mn—V—Fe | Ti$_{0.8}$Zr$_{0.2}$Mn$_{1.42}$V$_{0.52}$Fe$_{0.09}$ | 1.8 | 0.20 (45° C.) | −7.5 | 40 ... 160 |
| Ca—Mn—Ni—Al | Ca$_{0.85}$Mn$_{0.15}$Ni$_{4.85}$Al$_{0.15}$ | 1.5 | 0.18 (50° C.) | −7.8 | 20 ... 60 |
| Mn—Ca—Ni—Al | Mn$_{0.7}$Ca$_{0.3}$Ni$_{4.7}$Al$_{0.3}$ | 1.5 | 0.40 (−40° C.) | −6.5 | −40 ... 40 |
| Ti—Cr—V | Ti$_{20}$Cr$_{30}$V$_{50}$ | 2.4 | 0.04 (20° C.) | −10.0 | 0 ... 80 |
| Ti—Cr—V—Fe | Ti$_{27.8}$Cr$_{42.2}$V$_{25}$Fe$_{5}$ | 2.2 | 0.29 (−10° C.) | −9.6 | −10 ... 80 |

LIST OF REFERENCE SYMBOLS 10 fuel cell
12 fuel cell stack
14 membrane-electrode assembly (MEA)
16 polymer electrolyte membrane
18a first gas diffusion electrode (cathode)
18b second gas diffusion electrode (anode)
20a cathode-side catalyst layer
20b anode-side catalyst layer
22a cathode-side gas diffusion layer (GDL)
22b anode-side gas diffusion layer (GDL)
24 polymer material
26 electrolyte
28 bipolar plate
30 transport channel
32 first hydrogenatable layer
34 second hydrogenatable layer
Figure Legend
  In FIG. 2:

| Niedertemperatur-Brennstoffzelle | Low-temperature fuel cell |
|---|---|
| Flüssiggelelektrolyt . . . | Liquid gel electrolyte based on PBI/H$_3$PO$_4$ |

The invention claimed is:

1. Membrane-electrode assembly (14) for a fuel cell (10) with
   (a) a proton-conductive membrane (16),
   (b) two catalyst layers (20a, 20b) adjoining both sides of the membrane (16), wherein the catalyst layers have an electrically conductive base material and at least one catalytic material deposited on the base material, and
   (c) two gas diffusion layers (22a, 22b) adjoining the catalyst layers, wherein the membrane (16) and/or at least one of the two catalyst layers (20a, 20b) and/or at least one of the two gas diffusion layers (22a, 22b) adjoining the catalyst layers comprises at least one hydrogenatable material capable of binding hydrogen in a reversible exothermic hydrogenation operation by forming a hydride wherein the hydrogenatable material is distributed within the catalyst layer and/or within the gas diffusion layer and has a gradual or stepwise concentration gradient in the catalyst layer and/or in the gas diffusion layer.

2. Membrane-electrode assembly (14) according to claim 1 wherein the at least one hydrogenatable material is disposed in form of a porous layer (32, 34) on the side of the gas diffusion layer (22a, 22b) facing the catalyst layer (20a, 20b) and/or away from the catalyst layer (20a, 20b).

3. Membrane-electrode assembly (14) according to claim 1 wherein the at least one hydrogenatable material is disposed in form of a porous layer on at least one side of the membrane (16).

4. Membrane-electrode assembly (14) according to claim 1 wherein the at least one hydrogenatable material is a metal capable of forming hydrides at temperatures of −10° C. or lower or a metal alloy capable of forming hydrides at temperatures of −10° C. or lower, wherein the metal or metal alloy comprises at least one metal selected from the group consisting of Ti, Fe, Cr and Zr, and optionally Ca, Mg, Cu, Ni and/or Mn.

5. Membrane-electrode assembly (14) according to claim 1 wherein the at least one hydrogenatable material comprises two or more hydrogenatable materials with cascading overlapping absorption temperature ranges, thereby forming together a total absorption temperature range.

6. Membrane-electrode assembly (14) according to claim 1 wherein the at least one hydrogenatable material, or in the case of two or more hydrogenatable materials at least one of the materials, is selected so that its absorption temperature range begins at at most −10° C.

7. Membrane-electrode assembly (14) according to claim 5 wherein the absorption temperature ranges of the hydrogenatable materials in combination cover a total absorption temperature range, which at least approximately extends to a lowest operating temperature of the membrane-electrode assembly (14), in particular to 10K below the lowest operating temperature, preferably 5K below the lowest operating temperature.

8. Membrane-electrode assembly (14) according to claim 1 wherein the catalyst layers (20a, 20b) and the gas diffusion layers (22a, 22b) form a composite with a corresponding gas diffusion electrode (18a, 18b), or the catalyst layers (20a, 20b) and the membrane (16) form a composite with a catalyst-coated membrane (CCM).

9. Membrane-electrode assembly (14) according to claim 1 wherein at least the gas diffusion electrode that is connected as anode comprises the at least one hydrogenatable material as a switched catalyst layer (18b).

10. Membrane-electrode assembly (14) according to claim 1 wherein the polymer electrolyte membrane (16) comprises a polymer material (24) impregnated with at least one electrolyte (26), or comprises an ion-conducting polymer material, or is a SOFC membrane.

11. Method for starting a membrane-electrode assembly (14) according to claim 1 at a temperature below the operating temperature of the membrane-electrode assembly (14), with the steps:
   supplying a hydrogen-containing gas to gas diffusion electrode/electrodes (18a, 18b) containing the at least one hydrogenatable material,
   increasing the pressure of a reaction space/spaces supplied with hydrogen, so that hydrogen is absorbed by the at least one hydrogenatable material,
   when reaching a temperature that at least approximately corresponds to the lowest operating temperature of the membrane-electrode assembly (14), switching the gas supply to the fuel gases of the membrane-electrode assembly (14), and
   switching on an electric load.

12. Method according to claim 11, characterized in that during hydrogen absorption by the at least one hydrogenatable material, a cooling loop, which cools the membrane-electrode assembly (14), is controlled in a closed loop by bypassing a heat exchanger integrated in the cooling loop.

13. Membrane-electrode assembly (14) according to claim 6 wherein the at least one hydrogenatable material, or in the case of two or more hydrogenatable materials at least one of the materials, is selected so that its absorption temperature range begins at −20° C. or lower.

* * * * *